United States Patent [19]
Clauson

[11] Patent Number: 5,482,258
[45] Date of Patent: Jan. 9, 1996

[54] SHOCK MITIGATING TETHER SYSTEM

[76] Inventors: Walton E. Clauson, deceased, late of Apple Valley, Calif.; by Bernean D. Clauson, P.O. Box 511, Apple Valley, Calif. 92308, executrix

[21] Appl. No.: 335,135

[22] Filed: Nov. 7, 1994

[51] Int. Cl.⁶ .................................................. F16F 3/07
[52] U.S. Cl. .............................. 267/71; 267/72; 267/168; 267/170; 114/230
[58] Field of Search ............................. 267/70, 71, 72, 267/73, 74, 69, 168, 170, 179; 119/769, 771, 798; 114/230, 253, 249, 215; 410/100, 96, 103; 280/480, 483; 244/115, 116; 54/17

[56] References Cited

U.S. PATENT DOCUMENTS

| | | |
|---|---|---|
| 200,803 | 2/1878 | Riley .................................... 267/71 |
| 218,888 | 8/1879 | Lauffer ................................. 267/71 |
| 383,183 | 5/1888 | Leavell. |
| 593,788 | 11/1897 | Stone ................................... 267/168 |
| 1,482,918 | 2/1924 | Dutcher. |
| 2,120,528 | 6/1938 | Purweet. |
| 2,509,274 | 5/1950 | Nugey. |
| 2,627,692 | 2/1953 | Goodman. |
| 2,675,977 | 4/1954 | Berlichingen et al. ............. 267/71 |
| 2,933,311 | 4/1960 | Szpak. |
| 3,860,226 | 1/1975 | Hensiek, Jr. ........................ 267/69 |
| 3,952,685 | 4/1976 | Hollenbush. |
| 4,488,511 | 12/1984 | Grassano ............................. 267/70 |

FOREIGN PATENT DOCUMENTS 9006453  6/1990  WIPO ..................................... 280/480

*Primary Examiner*—Douglas C. Butler
*Attorney, Agent, or Firm*—Zarley, McKee, Thomte Voorhees & Sease; Mark D. Frederiksen

[57] ABSTRACT

A shock mitigating tether system includes a helical coil spring mounted within a tubular housing between opposing retention plates. A first cable is folded in half and journaled through the longitudinal axis of the spring such that a loop end projects from a first end of the spring and a pair of opposing ends of the cable are mounted to the tension plate on the second end of the spring. A second cable is also journaled longitudinally through the spring with a second cable loop projecting outwardly through an opening in the second plate and the second cable free ends mounted to the first plate, such that the cable loops project in opposing directions along the longitudinal axis of the coil spring. A pair of pins are mounted through diametric apertures in the ends of the housing outwardly of the plates, to retain the spring and plates within the housing.

3 Claims, 2 Drawing Sheets

5,482,258

SHOCK MITIGATING TETHER SYSTEM

TECHNICAL FIELD

The present invention is related generally to compressible springs utilized in tiedowns, and more particularly to a shock mitigating tether system.

BACKGROUND OF THE INVENTION

Aircraft are manufactured in many sized and configurations, from ultralights to large cargo jet military aircraft. With the advent of new materials, aircraft structures can carry much higher loads, but such aircraft are still susceptible to the effects of winds and waves. The major dynamic force which causes the destruction of moorings, fittings and attachments for aircraft and ships, is the dynamic shock which occurs in the movement or swing caused by slack in the tie-down lines. The more slack that is present in a tie-down line, the greater the swing of the wing, or ship, and the greater the impact of the shock at the fitting between the tie-down line and the aircraft or ship.

Similarly, rough water causes a moored vessel to rise and fall, pitching the bow and stern to port and starboard, and thereby tugging on the mooring lines. Each "tug" causes the fibers in the line to elongate and fatigue, thereby allowing the moored vessel more freedom to move and tug at the mooring fittings.

With aircraft tie-downs, it is common in the prior art to utilize tie-downs of linked chain with snap hooks at each end. Hemp rope and nylon straps and steel cables are alternative tie-downs known to the inventor to be utilized to tether aircraft. Yachts and commercial vessels typically use large diameter ropes or the like for mooring the vessel. In both cases, however, no shock mitigation is typically utilized, other than the elasticity inherent in the tie-down itself.

SUMMARY OF THE INVENTION

It is therefore a general object of the present invention to provide an improved shock mitigating tether system.

Another object is to provide a tether system with a shock absorber with a shield to prevent small parts from dispersing from a shock absorber which fractures under compression.

A further object of the present invention is to provide a tether system which provides a slight tensile load to remove slack from a tie-down.

Yet another object is to provide a shock mitigating tether system with "off the shelf" parts, which is economical to manufacture and simple to use.

Still another object of the present invention is to provide a shock mitigating tether system which is effective for very light to very heavy shock loads.

These and other objects will be apparent to those skilled in the art.

The shock mitigating tether system of the present invention includes a helical coil spring mounted within a tubular housing between opposing retention plates. A first cable is folded in half and journaled through the longitudinal axis of the spring such that a loop end projects from a first end of the spring and a pair of opposing ends of the cable are mounted to the tension plate on the second end of the spring. A second cable is also journaled longitudinally through the spring with a second cable loop projecting outwardly through an opening in the second plate and the second cable free ends mounted to the first plate, such that the cable loops project in opposing directions along the longitudinal axis of the coil spring. A pair of pins are mounted through diametric apertures. In the ends of the housing outwardly of the plates, to retain the spring and plates within the housing. In the second embodiment of the invention, a second coil spring having a smaller length in diameter is mounted coaxial within the first spring and connected to one of the plates. Preferably, the second coil has a larger gage of spring steel in the first coil.

BRIEF DESCRIPTION F THE DRAWINGS

DESCRIPTION OF THE PREFERRED EMBODIMENT

Figure 1:
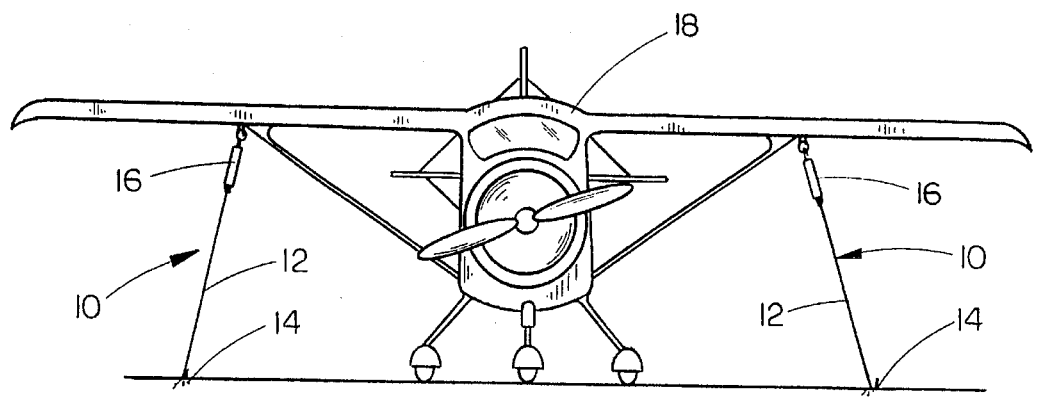
FIG. 1 is an elevational view of a lightweight airplane utilizing the shock mitigating tether system of the present invention as a tie-down.

Referring now to the drawings, in which similar or corresponding parts are identified with the same reference numeral, and more particularly to FIG. 1, the tether system of the present invention is designated generally at 10 and includes a cable 12 connected at one end to a ground anchor 14 and at the opposite end to a shock mitigator 16. As shown in FIG. 1, a pair of tether systems 10 are utilized as a tiedown for the wings of an airplane 18.

Figure 2:
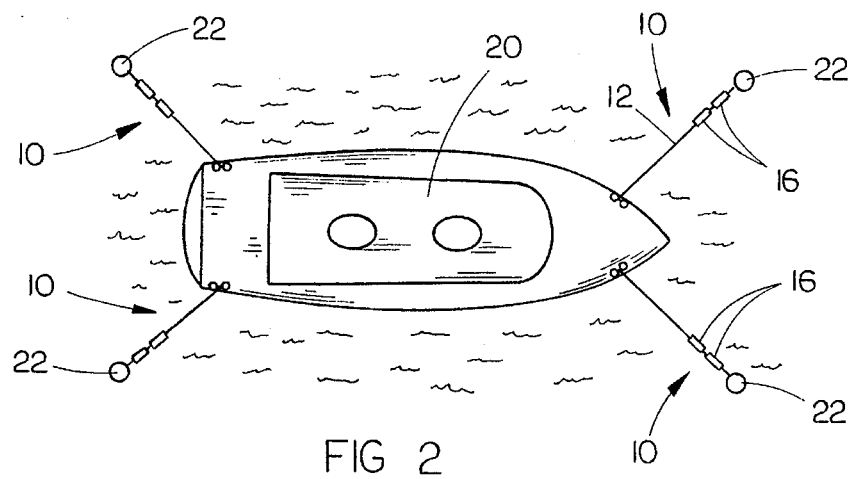
FIG. 2 is a top plan view of a ship having mooring lines utilizing a tether system with a pair of shock mitigators in tandem.

FIG. 2 shows four tether systems 10 connected to a ship 20 to moor the ship to posts 22. The tether system 10 shown in FIG. 2 includes the same cable 12, and a pair of shock mitigator 16.

Figure 3:
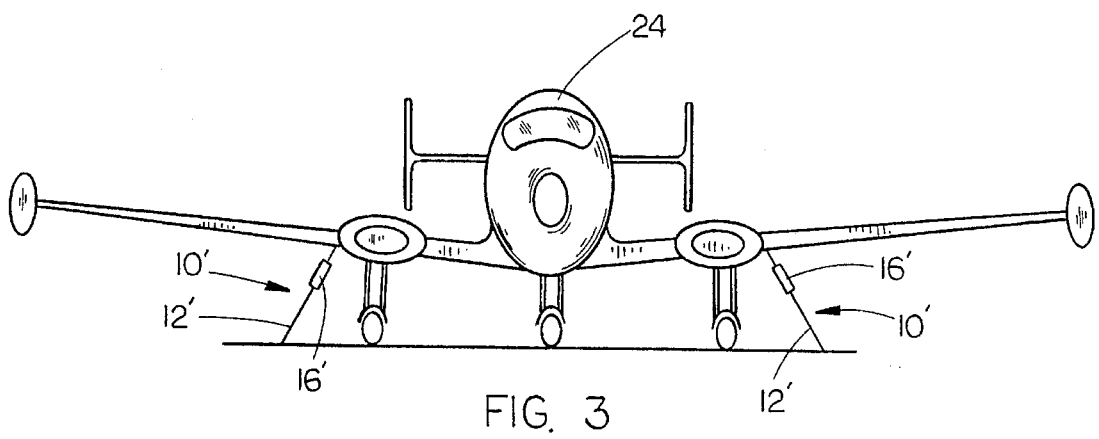
FIG. 3 is a front elevational view of a larger airplane utilizing the tether system of the present invention with a second embodiment of a shock mitigator.

Referring now to FIG. 3, a large airplane 24 utilizes a second embodiment of the tether system 10' to tie the wings to the ground. Tether system 10' utilizes a cable 12, and a second embodiment of a shock mitigator 16', as described in more detail hereinbelow.

Figure 4:
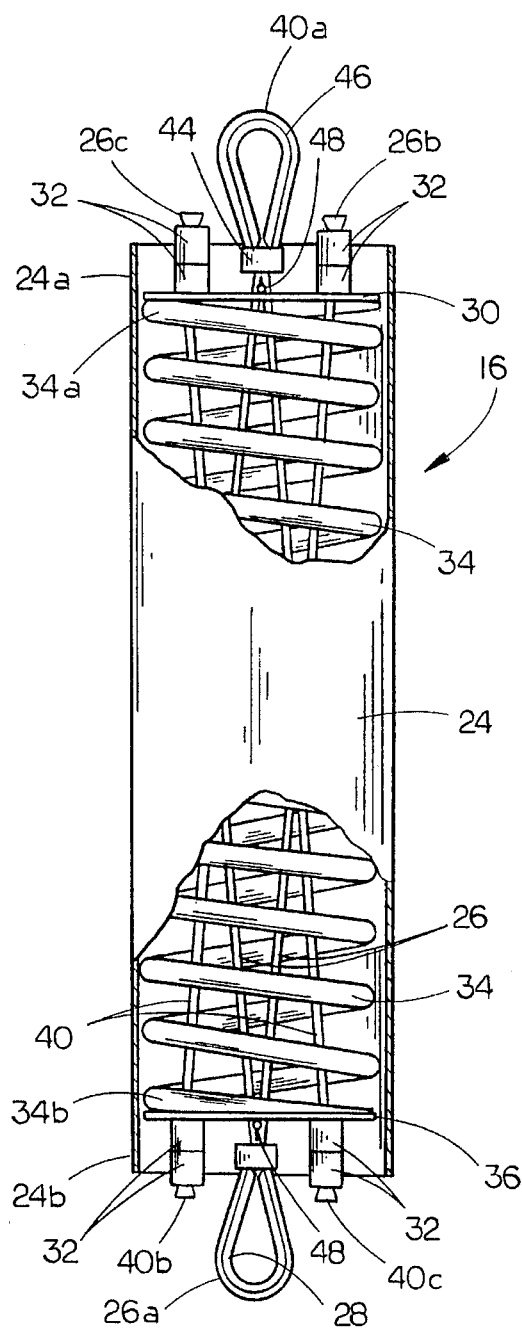
FIG. 4 is a side elevational view of a shock mitigator of the tether system, with portions broken away for clarity.

Referring now to FIG. 4, the shock mitigator 16 includes a generally cylindrical tubular shield 24 having open upper and lower ends 24a and 24b. A first tension cable 26 has the intermediate portion 26a thereof formed in a loop around a generally U-shaped eye sizer 28, and a pair of ends 26b and 26c extending through the length of shield 24 to the upper end 24a thereof. First cable ends 26b and 26c are threaded through a pair of apertures in a ring-shaped plate 30 so as to project upwardly therethrough. Stops 32 are affixed to cable ends 26b and 26c to prevent the ends from being pulled downwardly through plate 30.

A coil spring 34 has one end 34a connected to upward plate 30, and a lower end 34b connected to a second ring-shaped plate 36, to separate plates 30 and 36 within shield 24. First cable loop 26a projects downwardly through the central opening of plate 36, with a strap holder 38 crimped around the cable at the base of eye sizer 28, to maintain cable 26 on eye sizer 28. A second tension cable 40 has a loop 40a formed intermediate the ends 40b and 40c thereof, and journaled through the central opening 42 of upper plate 30 (also shown in FIG. 5) to project from the upper end of shield 24. A strap holder 44 is crimped around second cable 40 at the base of loop 40a to maintain the loop shape on an eye sizer 46. The ends 40b and 40c of cable 40 project downwardly through the center of coil spring 34 and thence through a pair of apertures in lower plate 36, and have stops 32 affixed thereto to prevent cable ends 40b and 40c from being pulled through plate 36 upon the application of force on loop 40a.

Figure 5:
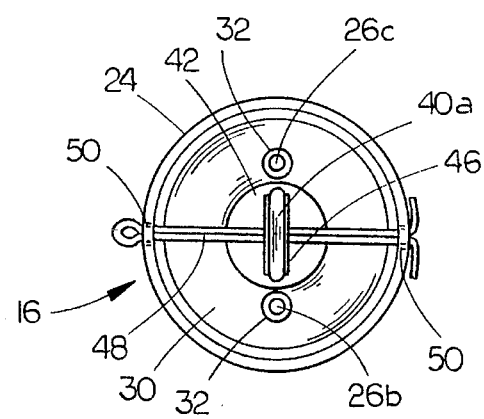
FIG. 5 is a top view of the shock mitigator shown in FIG. 4.

The upper and lower ends 34a and 34b of coil spring 34 are in contact with upper and lower plates 30 and 36, and apply a biasing force along the longitudinal axis of coil spring 34 in opposing directions against plates 30 and 36. A retainer pin 48 is journaled through a pair of diametric opposed apertures 50 in the upper end 24a of shield 24, to retain plate 30 in position on the upper end of spring coil 34, as shown in FIG. 5. A similar second pin 52 is journaled through a pair of diametric apertures 54 in the lower end 24b of shield 24 to retain plate 36 in position on the lower end of coil 34.

In operation, the shock mitigator 16, as shown in FIG. 4, has one cable loop 40a connected to a fitting on an aircraft or ship, and the opposite cable loop 26a connected to a rope or cable extending to a ground anchor. As a tension load is applied to cable loops 26a and 40a, cable 26 will transmit the tensile force on plate 30 against the bias of the upper end 34a of coil spring 34, while cable 40 will transmit an equal force in an opposite direction on lower plate 36 against the outward biasing force of coil spring 34. Thus, application of a tension load will cause plates 30 and 36 to move towards one another compressing coil spring 34, and permitting lengthening of of the entire tether system 10, as shown in FIG. 1. Because shield 24 surrounds coil spring 34, any fracture of the coil spring will retain all broken pads within the shield 24, thereby preventing injury to bystanders.

As shown in FIG. 2, a pair of shock mitigators 16 may be connected in tandem, each shock mitigator 16 preferably having a different size coil spring therein. In this way, a lighter, more sensitive coil will mitigate shocks from slight tension forces, which would not compress a larger sturdier compression spring, while the shock mitigator with the larger spring will absorb the larger tension loads applied to the tether system 10.

Figure 6:
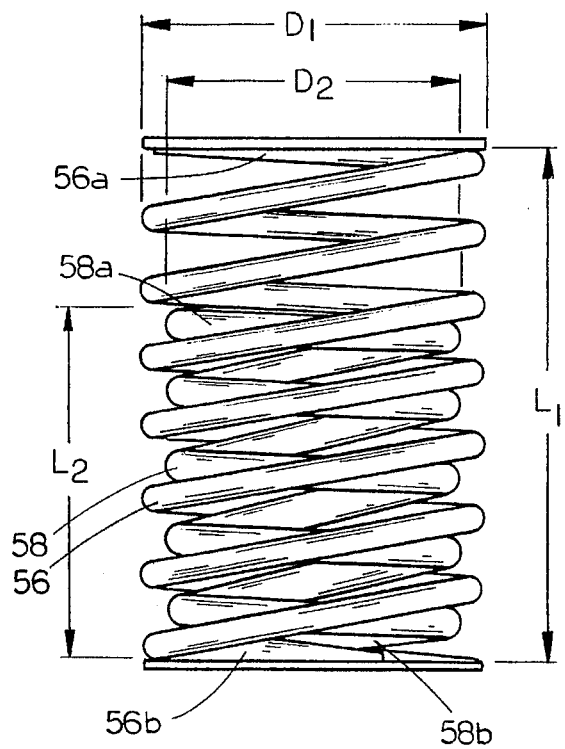
FIG. 6 is a side elevational view of a compound spring utilized in a second embodiment of the shock mitigator.

Referring now to FIG. 6, the interior coil of a second embodiment of the shock mitigator 16' is shown. A first coil spring 56 is formed in a conventional helix shape with a diameter $D_1$ and a length $L_1$. The upper end 56a of coil 56 is connected to upper plate 30', while the lower end 56b is connected to lower plate 36', to apply an outward biasing force $F_1$ to plates 30' and 36'.

A second coil spring 58, having a conventional helix shape with a diameter $D_2$ and a length $L_2$ has its lower end 58b connected to lower plate 36'. As shown in the drawing, second coil 58 has a diameter less than first coil 56, so as to fit coaxially within first coil 56. In addition, second coil 58 has a length $L_2$ less than the length $L_1$ of coil 56. Preferably, second coil 58 is also a larger gage spring, thereby providing a greater biasing force $F_2$ along its longitudinal axis. The use of mitigator 16', as shown in FIG. 3, provides a combination shock mitigator which is sensitive to both very light loads and very heavy loads, by virtue of the use of two different coil springs 56 and 58, as shown in FIG. 6. A light load will compress first coil spring 56 until the biasing force compresses spring 56 to a length equal to length $L_2$ of second coil spring 58. At that point, a much greater biasing force is required to compress shock mitigator 16', since both coil springs 56 and 58 are applying a combined biasing force $F_1$ plus $F_2$.

Whereas the invention has been shown and described in connection with the preferred embodiments thereof, many modifications, substitutions and additions may be made which are within the intended broad scope of the appended claims.

I claim:

1. A shock mitigating tether system, comprising:

a helical coil spring operably mounted within a tubular housing for compressible movement inwardly and outwardly along a longitudinal axis coaxial with the longitudinal axis of the housing;

a first ring-shaped plate mounted on a first end of the spring, perpendicular to the longitudinal axis of the spring;

a pin journaled through diametric apertures in a first end of the housing, located longitudinally outwardly from the first plate;

a second ring-shaped plate mounted on a second end of the spring, perpendicular to the longitudinal axis of the spring;

a second pin journaled through diametric apertures in a second end of the housing, located longitudinally outwardly from the second plate;

said pins retaining said plates and spring therebetween within said housing;

a first cable folded in half to form a loop at one end and a pair of ends opposite the loop end, said cable journaled longitudinally through said spring with the loop end projecting longitudinally outwardly through a central opening in the first plate, and the pair of first cable ends connected to said second plate;

a second cable folded in half to form a loop at one end and a pair of ends opposite the loop end, said second cable journaled longitudinally through said spring with the second cable loop end projecting longitudinally outwardly from a central opening in the second plate, and the pair of second cable ends connected to said first plate; and a tether cord removably connected to said first cable loop and extending therefrom.

2. The tether system of claim 1, further comprising:

a second helical coil operably mounted coaxial with a first coil within said housing; the diameter of the helix of the second coil being less than the diameter of the helix of the first coil;

the length of the second coil being less than the length of the first coil; and said second coil having first and second ends, the second end connected to said second plate coaxial with the first coil.

3. The tether system of claim 2, wherein said first and second coils are formed of different gages of spring steel.

\* \* \* \* \*